United States Patent [19]

Lazure

[11] 4,142,817
[45] Mar. 6, 1979

[54] PLOW FOR USE IN LAYING DRAIN-TILE

[76] Inventor: Germain Lazure, 105 Ave. Beauregard, St-Jean d'Iberville, Quebec, Canada, J2X 2L9

[21] Appl. No.: 870,736

[22] Filed: Jan. 19, 1978

[51] Int. Cl.² ............................................ F16L 1/00
[52] U.S. Cl. .................................. 405/174; 37/193; 172/740
[58] Field of Search ................ 61/72.6, 72.5, 72.2, 61/105, 11; 37/193; 172/740

[56] References Cited

U.S. PATENT DOCUMENTS

| 1,279,733 | 9/1918 | Lodwig | 172/740 X |
|---|---|---|---|
| 3,217,500 | 11/1965 | Diamond et al. | 61/72.5 |
| 3,268,012 | 8/1966 | Ratkowski | 172/740 |
| 3,300,989 | 1/1967 | Reising | 61/72.6 |
| 3,657,831 | 4/1972 | Kant | 37/193 |
| 3,777,500 | 12/1973 | Kelley | 61/72.6 |
| 3,851,489 | 12/1974 | Richardson | 61/72.6 |

Primary Examiner—Jacob Shapiro

Attorney, Agent, or Firm—Arthur Schwartz; Francis B. Francois

[57] ABSTRACT

An improved plow for use in laying drain-tile. The plow has a narrow body with an elongated upright portion and a triangular portion at the bottom, front end of the upright portion. Means on the body guide a drain-tile from an inlet high in the upright portion to an outlet at the bottom, rear of the upright portion. The plow has a plow blade detachably and adjustably fixed to the leading edge of the triangular portion. A near shoe and a plow knife may also be detachably fixed to the plow. The plow knife includes means for moving earth in a manner that it fills in the drain-tile trench. Linkage means are provided for connecting the plow to a tractor in a manner that it can be easily maneouvered. The linkage means includes an adjustable link that can change the attitude of the plow. The plow may also comprise means for laying a cover strip on top of the drain-tile as it is being laid.

23 Claims, 10 Drawing Figures

PLOW FOR USE IN LAYING DRAIN-TILE

The present invention relates to an improved plow for use in laying drain-tile.

Plows for laying cables, pipes or drain tiles are known as shown in U.S. Pat. Nos. 2,135,973; 3,217,500; 3,391,545 and 3,528,255 by way of example. The general procedure is to dig a trench, lay a continuous length of tile in the trench, and cover the tile in the trench all in one continuous operation. The plow is pulled by a tractor, connected to it by a suitable linkage.

The known plows all have disadvantages however.

Many are made in a unitary construction and when certain areas of the plow get too worn, the entire plow must be replaced which is expensive. Other plows, which might employ a replaceable plow blade, do not provide for incremental adjustment of the blade. Still others are inefficiently designed for plowing through the soil since they present a leading edge which is generally totally vertical.

Many of the known plows do not adequately fill in the trench and in many cases, a separate trench filling unit must be employed.

Many of the known plows do not have means by which they can be easily maneouvered on a tractor or quickly moved into a proper plowing position. In addition adjustment is seldom provided for changing the angle of attack of the plow to suit the type of soil it is plowing.

None of the known plows provide any means for covering the drain-tile with a liquid permeable, sand impermeable, cover when laying the tile in sandy soil so as to prevent sand from entering the tile and possible clogging it up.

It is one purpose of the present invention to provide an improved plow for laying drain-tile, which has replaceable parts at the main points of wear, thereby making the plow less expensive.

It is another purpose of the present invention to provide an improved plow having a replaceable and adjustable plow blade.

It is a further purpose of the present invention to provide an improved plow which fills in the trench more efficiently while simultaneously laying the tile.

It is yet another purpose of the present invention to provide a plow which can be easily maneouvered by a tractor to place it in a proper operating position and further, which can be easily adjusted to operate most efficiently in different soil conditions.

It is another purpose of the present invention to provide an improved plow which includes means for laying a cover strip on the drain tile as it is being laid which strip is impervious to sand but passes water.

It is also a purpose of the present invention to provide a simple yet rugged and easily maintained and operated drain tile-laying plow.

In accordance with the present invention, there is provided a plow for use in laying drain-tile which plow comprises a narrow body having an upright elongated portion and a triangular portion at the bottom, front end of the upright portion, the triangular portion of the plow body having an angled leading edge. The bases of the two body portions together form the base of the plow. Means are provided within the plow for guiding a drain tile from an inlet high in the upright portion to an outlet at the bottom, rear of the upright portion. The plow also comprises a plow blade which is detachably fixed to the angled leading edge of the triangular portion of the plow body and a linkage for connecting the plow body at two spaced apart points on its upper portion to a tractor.

In accordance with a first preferred embodiment of the invention, the plow comprises means for adjusting the plow blade to the leading edge to compensate for blade wear.

In accordance with another preferred embodiment of the invention, the plow includes a wear shoe and means for detachably fixing the wear shoe to the base of the plow, and projecting backwardly from the leading edge.

The plow knife preferably includes spaced-apart sets of brace plates on both sides of the plow knife. The brace plates extend upwardly from their leading ends to guide earth therealong. This earth moves off the trailing ends of the plates to properly fill in the trench.

The linkage preferably has upper and lower support links each pivotably and oscillatory connected at one end to the plow body. Means are provided for adjusting the length of the upper link.

In accordance with a further preferred embodiment of the invention the plow includes means on the plow body for directing a cover strip onto the tile as it is being laid.

The invention will now be described in detail having reference to the accompanying drawings in which.

Referring to the drawings, the plow 1 is constructed for burying flexible drain-tile 3. The drain-tile 3 is supplied from a source (not shown) carried by a tractor 5 which pulls the plow 1. The plow 1 is connected to the tractor 5 by a linkage 7 which will be described hereinafter in more detail.

The plow 1 has a narrow main body 11. The main body 11 has an elongated, generally upright portion 13 and a triangular portion 15 at the lower, front corner of the upright portion 13. The upright and triangular portions 13 and 15 give the main body 11 a boot-shaped configuration. The bottoms of the upright and triangular portions 13 and 15 form the bottom 17 of the plow. This bottom edge 17 is rounded. The main body 11 can be constructed from heavy steel plates fastened by bolts, or other suitable means, to suitable framing.

A channel or duct 19 is provided within the upright portion 13 of the main body 11, extending between an inlet tube 21, mounted on one side 23 of the main body near its top end 25, and an outlet 27 at the bottom rear corner 29 of the main body. The inlet tube 21 is relatively short and faces generally forwardly. The drain-tile 3 passes into the tube 21, into the duct 19 within the plow body 11, and exits from the outlet 27 in a generally horizontal direction.

Figure 5:
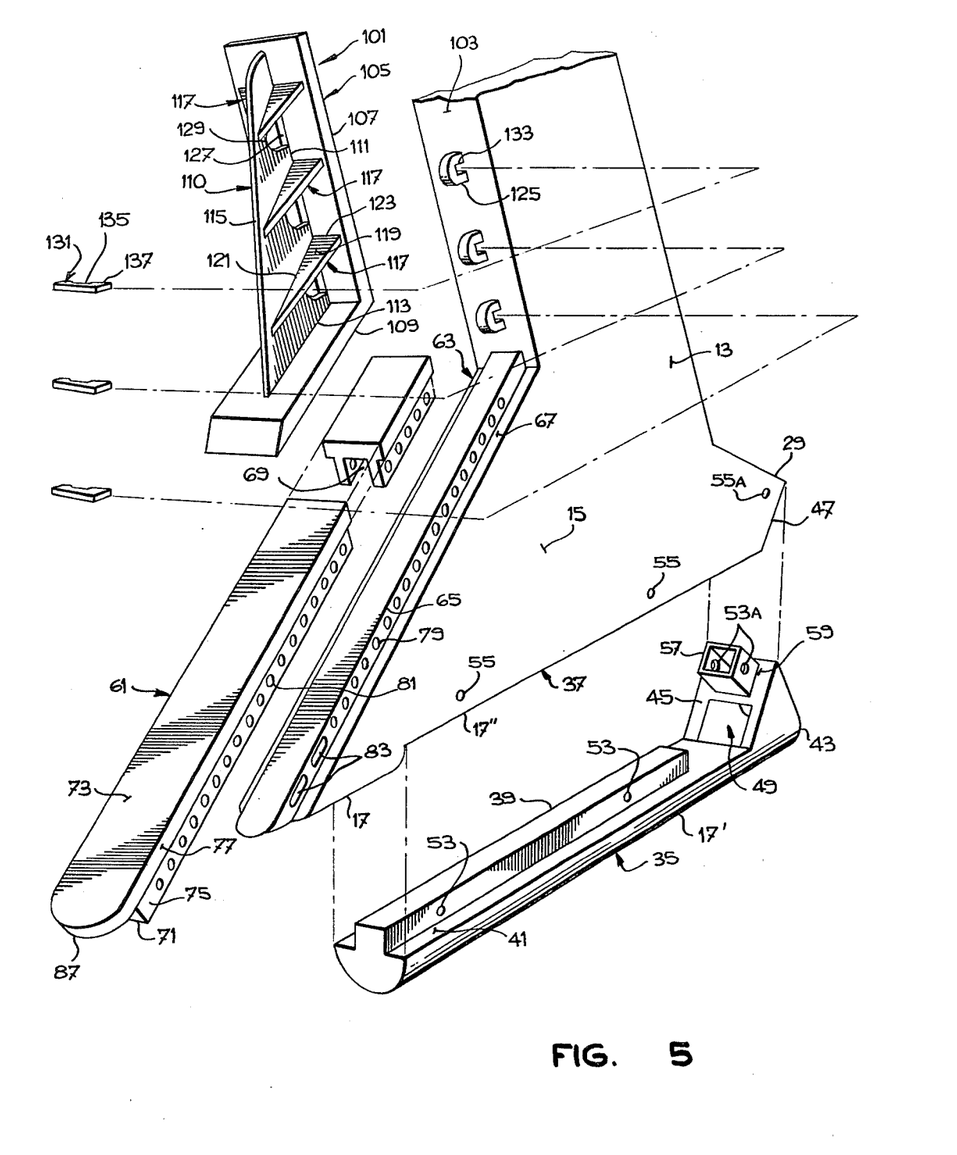
FIG. 5 is an exploded, perspective view of the plow showing its various detachable parts.

The plow 1 has a wear shoe 35 detachably connected to its bottom 17. As shown in FIG. 5, the wear shoe 35 extends over a major portion of the bottom 17 including the rear portion of the plow which is subjected to more wear than the front portion. The bottom edge 17 has a cut-out 37 for receiving the shoe 35 so that the bottom 17' of the shoe 35 is flush with the bottom 17 of the plow body, when mounted thereon. The wear shoe 35 preferably has a longitudinal rib 39 centrally located on its upper surface 41 which rib fits in a groove (not shown) formed in the bottom edge 17" of the cut-out 37.

The rear end 43 of the shoe 35 has a triangular portion 45 thereon which portion mates with an angled surface 47 on the lower, rear corner 29 of main body 13. A through opening 49 is formed in the portion 45. When the shoe 35 is mounted on the main body 11, the opening 49 is aligned with the duct 19, and the outer end of the opening 49 forms outlet 27. The drain-tile passes through the opening 49 leaving plow body 11. The shoe 35 is detachably connected to the plow body 11 by bolts 51 passing through aligned holes 53 and 55 in the shoe and body respectively.

A rectangular plug 57 is mounted on the angled surface 59 of the triangular portion 45. The plug 57 fits in a mating hole (not shown) in the surface 47 on the main body 11, against which the angled surface 59 abuts when the shoe is mounted on the plow body. Plug 57 serves to strengthen the connection of the shoe to the main body. A pin 51 can pass through a hole 53A in the plug, which hole is aligned with holes 55A in the plow body, adjacent surface 47.

The plow 1 has also an elongated plow blade 61 which is detachably and adjustably mounted on the angled leading edge 63 of the triangular portion 15 of the plow body. Preferably, the leading edge 63 has a longitudinal rib 65 centrally located on the flat surface 67 forming the leading edge 63. This rib 65 fits snugly within a central, longitudinal groove 69 formed on the bottom surface 71 of the blade 61 so as to locate the blade 61 when it is mounted on edge 63. The upper surface 73 of the blade 61 is flat, and the lower portions 75 of the side surfaces 77 are recessed. A row of holes 79 are formed in the rib 65. A row of holes 81 are also formed in blade 61 through the side surface portions 75. The spacing between the holes 79 in the rib 65 and the spacing between the holes 81 in the blade 61 are both constant. One, or as shown, two elongated slots 83 are also formed in rib 65, at its front end in front of holes 79. The slots 83 form an extension of the row of holes 79 and each slot 83 preferably is as long as the distance between two adjacent holes 79. Several pins (not shown) are used to detachably fasten the blade 61 onto the edge 63 with the rib 65 fitting in the groove 69 and with the tip 87 of the blade 61 projecting just below the bottom edge 17 of the plow. The pins pass through some of the aligned holes 79 and 81 and through the holes 79 aligned with the two slots 83. As the tip 87 of the blade wears down, it can be repositioned incrementally on edge 63, by removing the bolts, sliding the blade 61 down along the rib 65 until the holes 81 align with the next holes 79 adjacent to the holes 79 they were previously aligned with, and refastening the bolts 85. As described, the blade is adjusted for wear incremental distances equal to the spacing between holes 79 and 81. The holes 79 are spaced so that every group, of say four holes 79, cover the same distance as every group of three adjacent holes 81. This allows a finer incremental adjustment of blade 61 to compensate for wear. The slot or slots 83 permit the leading edge of the blade to be firmly fastened to the plow, while allowing for this fine adjustment.

It will be seen that the two areas on the plow most affected by wear have been constructed with replaceable parts. Thus only the wear shoe 35 and plow blade 61 need to be replaced as a result of wear, instead of the entire plow. In addition, the plow blade 61 is provided with means whereby it can be adjustably mounted on the plow to compensate for wear, before it needs to be entirely replaced.

To further improve the maintainance of the plow 1, there is provided a plow knife 101 which is detachably mounted on the leading edge 103 of the upright section 13 of the plow body 11. The plow knife 101 has a support 105 consisting of a vertical support bar 107 and a bottom, downwardly angled support bar 109 extending from, the joined to, the bottom end of support bar 107. The support bar 107 fits flush against the flat leading edge 103 while the support bar 109 fits flush on the flat upper surface 73 of the rear portion of plow blade 61. A knife blade 110, having a generally triangular shape, is mounted centrally, along two adjacent edges 111 and 113, on both support bars 107 and 109. The third edge 115 of the knife blade is unsupported and projects forwardly. Several sets 117 of brace plates brace the knife blade 110 to the support 105. Each set 117 comprises a pair of generally narrow, triangular plates 119 with a plate 119 on each side of knife blade 110. Each plate 119 is attached along its long edge 121 to blade 110 and along its short edge 123 to the support bar 107. The plates 119 in each set are aligned, and each set 117 slopes downwardly from the bar 107, lying generally parallel to bar 109. The plate sets 117 decrease in size moving upwardly from the bar 109 and are generally equally spaced apart.

The plow knife 101 is detachable mounted on the plow 1. To this end, a set of spaced-apart, aligned, U-shaped lugs 125 are mounted centrally on the leading edge 103 of the plow body 11. Matching slots 127 are formed in the support bar 107 through which the lugs 125 pass when mounting the knife on the plow. Cut-outs 129 are formed in the edge 111 of the knife blade 109 adjacent the slots 127 to receive the lugs 125 when they pass through slots 127. Wedges 131 are provided for passage through the openings 133 in lugs 125 when the lugs 125 are passed through slots 127 to wedge the bar 107 tightly against the edge 103. Each wedge 131 has a central notch 135 in one edge 137 for receiving a lug 125 to lock the knife 101 on the plow.

The plow knife 101 cuts through the earth as the plow is operated. The sloping brace plates 119 serve to direct displaced earth upwardly and this earth then falls down off the rear of the plates filling up the trench being dug as the plow moves forwardly. When the knife 101 wears down, it can be readily replaced without having to replace the entire plow.

The plow 1 is connected to the tractor 5 by a linkge 7 through which the plow can be manipulated. As shown in FIGS. 1 to 4 the linkage 7 has a first bottom plow mounting link 151 pivotably connected at one end to a bracket 153 mounted on the bottom frame of the tractor by a pin 155. The linkage 7 also has a second, upper plow mounting link 157 pivotably connected at one end to a bracket 159 on the back of the tractor by a pin 161. The bracket 159 is located above the bracket 153 and vertically aligned with it. The other ends of the plow mounting links 151 and 157 are joined by a vertically connecting link 163 connected pivotably to the links 151 and 157 by pins 165 and 167 respectively. Links 151, 157 and 163 form a first parallelogram linkage 169 for mounting the plow to the tractor.

A first support link 171, pivotably connected at one end to the pin 165, is pivotably connected at its other end to the upright portion 13 of the plow body by a pin 173. The pin 173 is located just above the top of the plow knife 101 and spaced well below the top end 25 of the plow body 11. A second support link 179 is pivotably connected at one end to pin 167. The other end of the second support link is pivotably connected to the top end 25 of the plow body by a pin 181. The support links 171 and 179, along with plow body 11 form a second parallelogram linkage 183.

Figure 1:
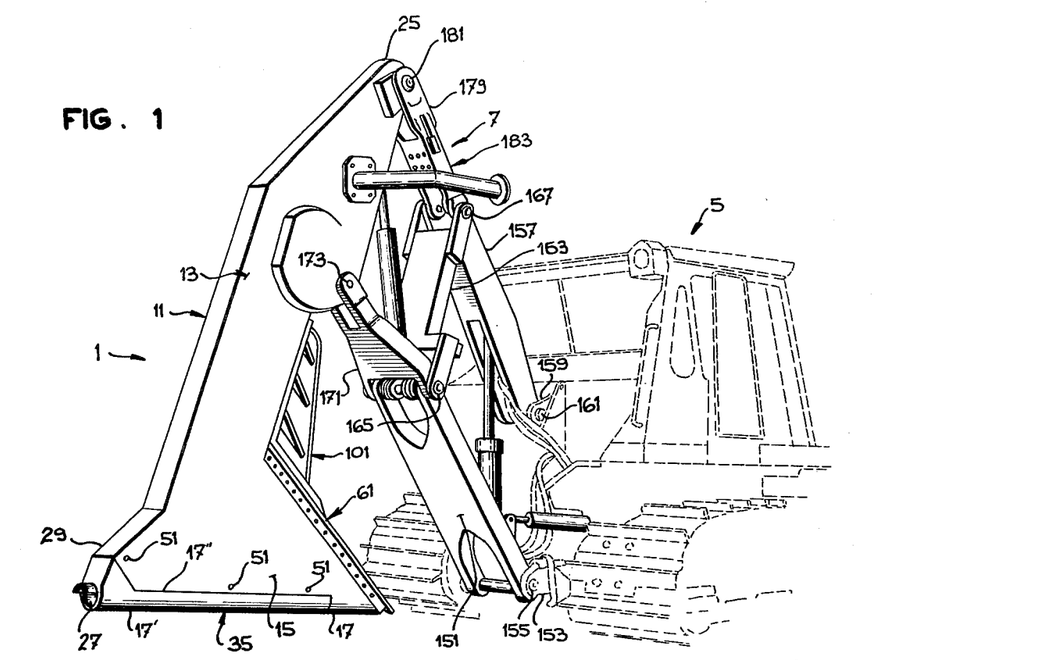
FIG. 1 is a perspective view of a plow according to the invention connected to a tractor.
Figure 2:
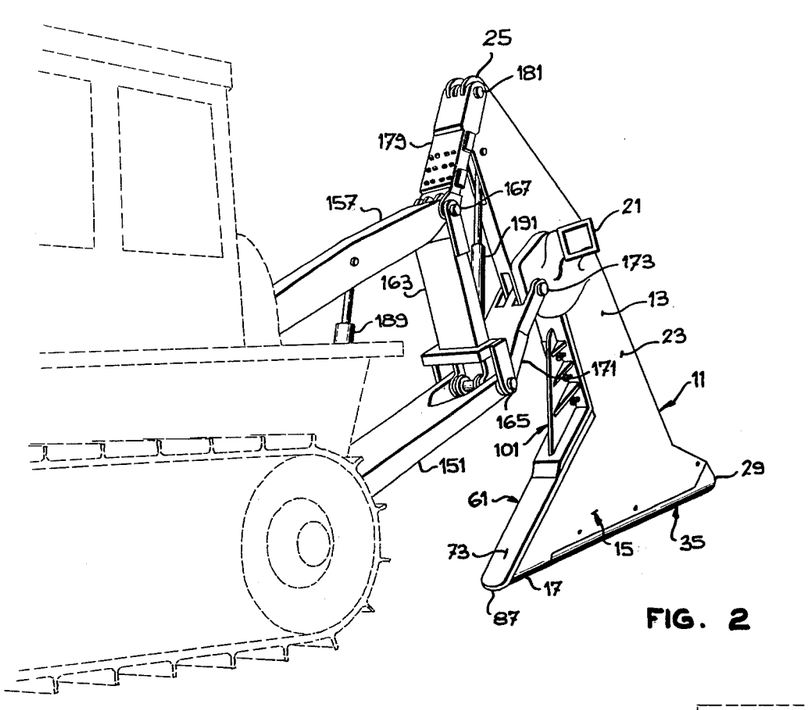
FIG. 2 is another perspective view of the plow connected to the tractor.
Figure 3:
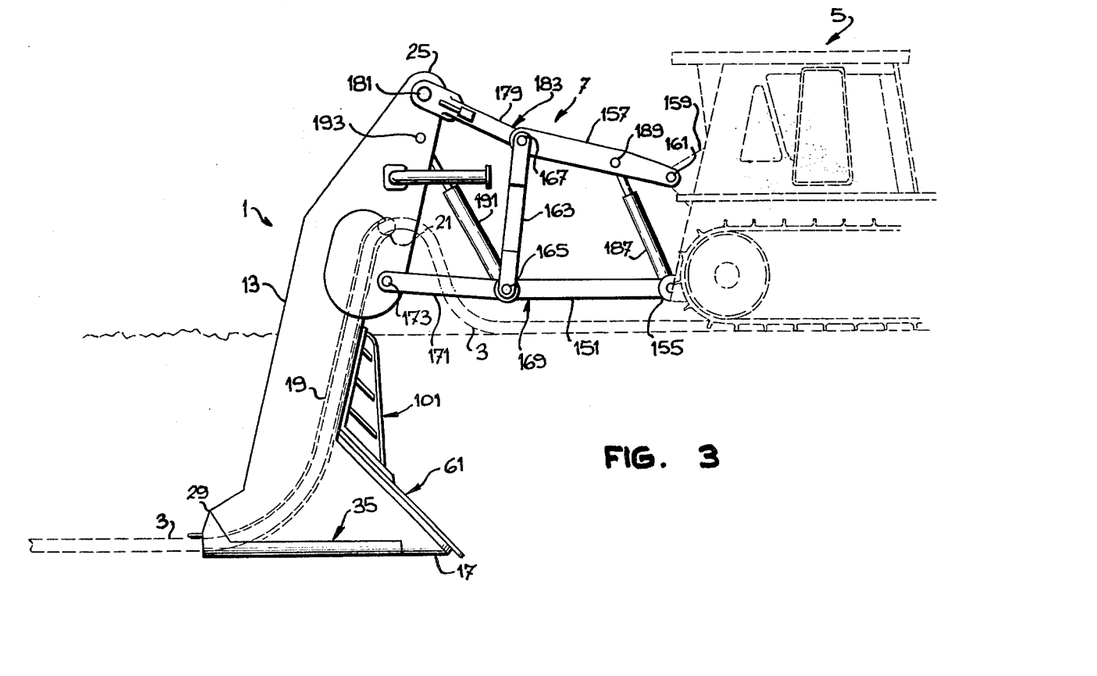
FIG. 3 appearing on the same sheet as FIG. 1, is an elevation view showing the plow in use.

A first moving means, consisting of a first hydraulic cylinder 187, moves the first parallelogram linkage 169, and consequently the connected second parallelogram linkage 183 including the plow 1. The cylinder 187 is pivotably connected at one end to the pin 155. The other end is pivotably connected to the second mounting link 157, intermediate its ends, by a pin 189. In operation, the cylinder 187 raises or lowers the plow about the pins 155 and 161. When the cylinder 187 lowers the plow, the latter is operative as shown in FIG. 3. When the cylinder 187 raises the plow, the latter is above the ground as shown in FIG. 1. The cylinder 187 also permits to adjust the depth at which the plow operates and may be operatively connected to a known electronic sighting system to compensate for the variation in depth of the plow resulting from the undulation of the ground. A second moving means consisting of a second hydraulic cylinder 191, moves the second parallelogram linkage 183 relative to the first parallelogram linkage 169. The second hydraulic cylinder 191 is pivotably connected at one end to the pin 165. The other end is pivotably connected to plow body 11 by a pin 193 spaced slightly below pin 181. In operation, the second cylinder 191 raises or lowers the plow relative to the first parallelogram linkage 169 to provide complementary adjustment of the plow depending on the depth at which the plow operates. The first cylinder 187 places the plow in an operative position at a proper operating depth. The second cylinder 191 is then used as complementary adjustment to maintain the plow in its proper operating orientation relative to the ground at the proper operating depth. The second cylinder 191 may also be operatively connected to the aforesaid known electronic sighting system so that any deformation of the first non-regular parallelogram linkage 169 can be immediately compensated for by a complementary deformation of the second parallelogram linkage 183 to lay the drain-pipe along a regular path.

Figure 4:
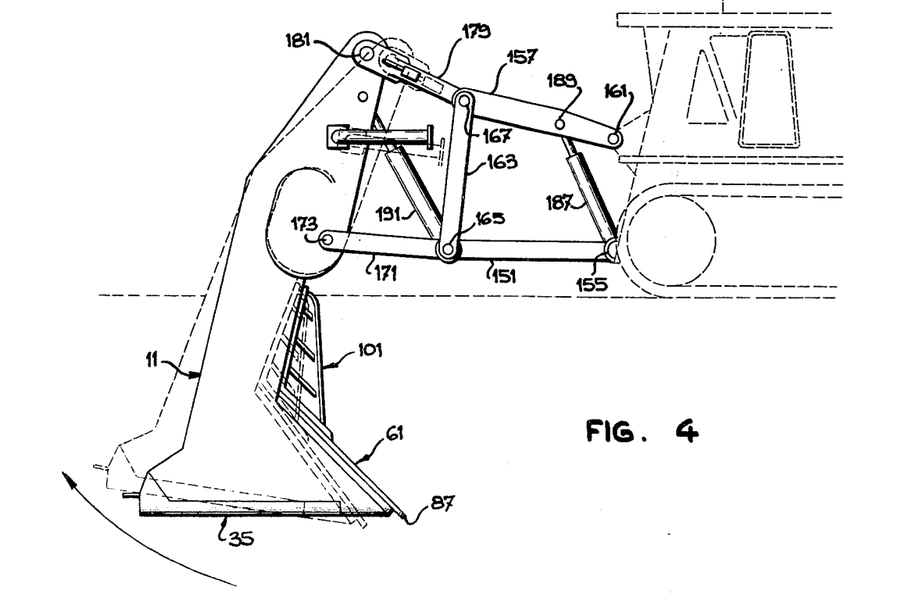
FIG. 4 is an elevation view showing how the plow position can be adjusted.

The second support link 179 is constructed to be adjustable in length. This feature permits the angle of the plow to be adjusted as shown in FIG. 4. When the link 179 is shortened, the plow is pivoted clockwise about pin 173, raising its heel end 29 and lowering the point 87 of the plow blade 61. With the bottom 17 of the plow at a slight angle to the horizontal it is well suited for plowing through soft sandy soil. Through harder soil, the plow is adjusted to have its bottom 17 more horizontal by lengthening link 179, and pivoting the plow counterclockwise about pin 173. During adjustment of the link 179, the hydraulic cylinder 91 is free to lengthen or shorten.

Figure 6:
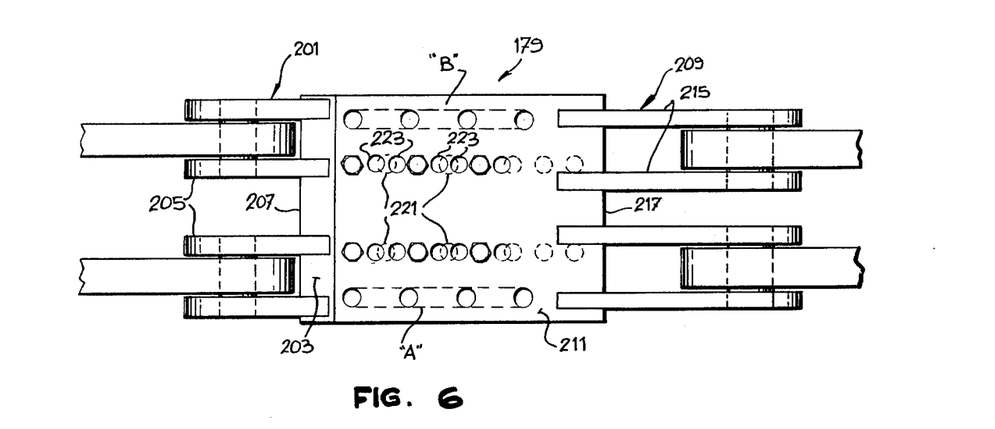
FIG. 6 is a plan view of an embodiment of adjustable means in the linkage for use in adjusting the working position of the plow.
Figure 7:
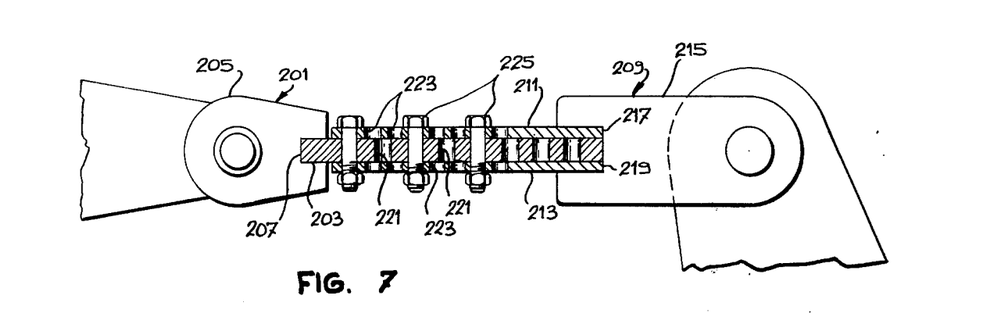
FIG. 7 is an elevation view of the adjustable linkage means shown in FIG. 6.

According to a first embodiment shown in FIGS. 6 and 7, the link 179 comprises a first link segment 201, comprising a central connecting plate 203 and connecting flanges 205 extending from one end 207 of plate 203. The link 179 comprises a second link segment 209, comprising a spaced-apart pair of outer connecting plates 211 and 213 and connecting flanges 215 extending from the ends 117 and 219 of plates 211 and 213 respectively.

The link 179 is formed by sliding the central plate 203 of the segment 201 between the plates 211 and 213 of the segment 209 and joining them together. To this end, the central plate 203 contains two or more rows of spaced-apart through holes 211. The outer plates 211 and 212 also contain two or more rows of spaced-apart through holes 223. The rows in plate 203 match the rows in plates 211 and 213. However, the holes 223 in the plates 211 and 213 preferably are closer spaced than the holes 221 in the plate 203 as shown to allow a finer incremental adjustment of the plate 203. Bolts 225 pass through the aligned holes 221 and 223 in plates 203, 211 and 213 to connect the link segments together. The plate 203 can be move incrementally with respect to the plates 211 and 213 to align a different set of holes 221 and 223 through which the bolts can be passed, so as to lengthen or shorten the link 179. In order to facilitate adjustment of the plates 203, 211 and 213 with respect to each other, the latter may be provided with two or more elongated slots "A" parallel to the rows of through holes and through which may pass several bolts. This arrangement permits to maintain the segments 201 and 209 of the link 179 in position while sliding the same in the adequate relative position.

Figure 8:
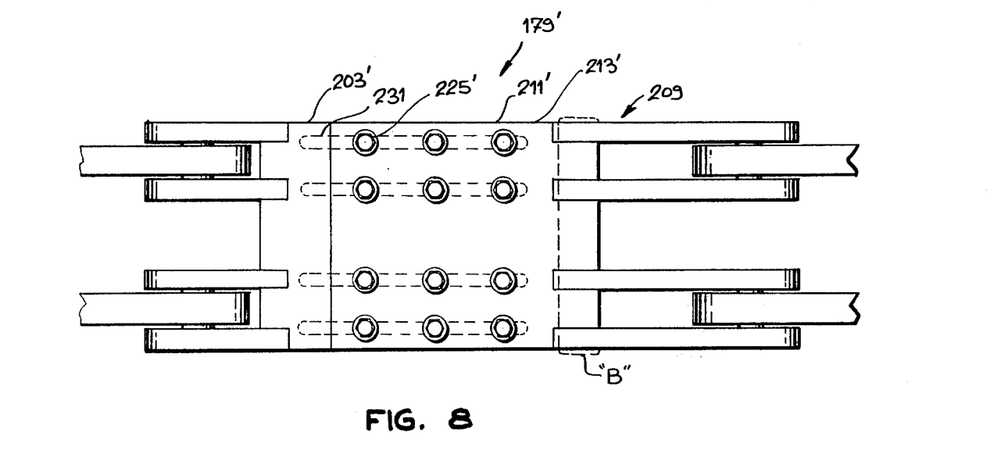
FIG. 8 is a plan view of another embodiment of adjustable means in the linkage.

According to another embodiment shown in FIG. 8, the plate 203' can be provided with elongated slots 231 instead of holes 221 through which bolts 225' pass. The pass 211' and 213' are provided with single holes for each bolt 225 used. As can be seen, the slots 231 permit infinite adjustment in the length of the link 179'. In order to avoid any shifting of the plates 203', 211 and 213' in operation, a wedge "B" may be inserted between the free end of the plate 203' and the end of the segment 209 to jam on the same with respect to each other.

Figure 9:
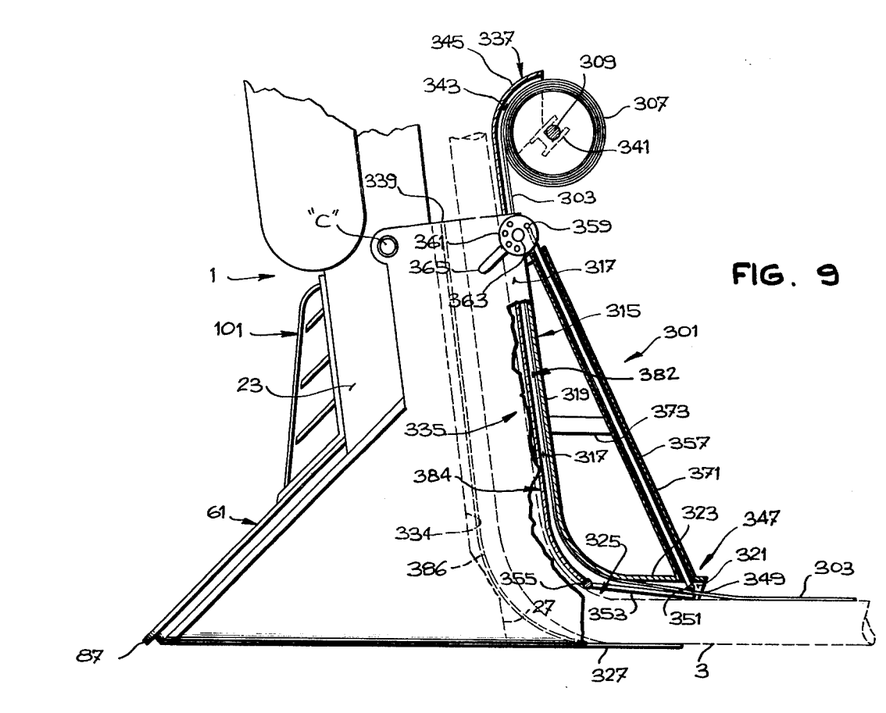
FIG. 9 is an elevation view of the plow showing means for handling a tile covering.
Figure 10:
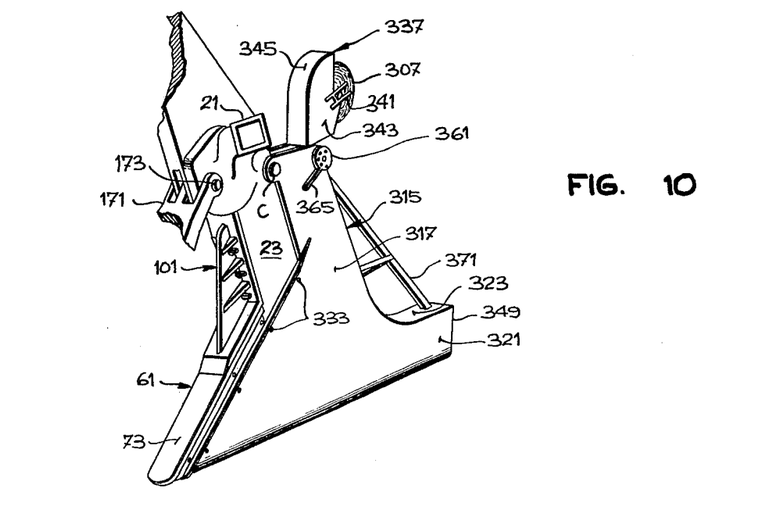
FIG. 10 is a perspective view of the plow shown in FIG. 9.

The above described plow may further include means 301 for laying a flexible, water permeable covering, such as a strip of cloth 303 on top of the drain tile 3 as it is being laid by the plow 1. The cloth strip 303 is particularly useful when the tile is being laid in sandy soil. The strip is laid on top of the tile to cover the drain perforations in the tile to prevent sand from entering the tile through the perforations. The cover strip 303 can be supplied in reel form 307, wound on an axle 309. As shown in FIGS. 9 and 10 the cover laying means 301 includes a guide shell 315 which is fixed to the plow by a pin "C". The laying means 301 has sidewalls 317 and a backwall 319 joining the sidewalls 317 together. The sidewalls 317 and backwall 319 have lower, rearwardly extending portions 321 and 323 respectively forming a rearwardly extending outlet channel 325. A short bottom wall 327 closes the channel 325 forming it into a tube. The outlet 27 in the plow body 11 from which the drain tile 3 emerges is spaced a short distance from, but aligned with, channel 325. The generally U-shaped guide shell 315 is fitted over the lower rear portion of the plow body 11 with its sidewalls 317 lying adjacent the sidewalls 23 of the plow body 11, and bolted thereto by pins 333. A vertical channel 382, allowing the passage of cloth strip 303 is forming between backwall 319 and wall 384, which is the prolongation of cover strip holder 337. The walls 319 and 384 are covered with a sheet of stainless steel to avoid corrosion and to facilitate sliding of the cloth strip. Another parallel channel 335, forming between wall 384 and another wall 386 near the back edge 334 of the plow body serve as guide means for the drain-tile to be laid when the latter has a diameter which is larger than that of the outlet 27.

A removable cover strip holder 337 is mounted on the rear of the top edges 339 of the sidewalls 317. The holder 337 has slot means 341 in its sidewalls 343 for rotatably mounting the axle 309. The sidewalls 343 of the holder 337 are joined by an endwall 345 extending up from edges 339 of the guide sidewalls 317 and curved over at its top end.

Guide means 347 are provided within the channel 335 adjacent the outlet end 349 of the channel for laying the cover strip directly on top of the drain-tile after it emerges from the outlet 27 in the plow body 11 and before it emerges from outlet 349 of channel 335. The guide means 347 comprises a curved guide bar 351 mounted between sidewalls 317 and lying closely adjacent to top of the drain-tile as it leaves channel 335.

The guide means 347 also comprises a support plate 353 which is pivotably mounted about a pin 355 extending between the sidewalls 317 of the shell 315 adjacent the top wall 319. In operation, the plate 353 bears on the drain-tile which is being laid and the cover strip 303 passes between this plate 353 and the bar 351 from channel 335, and drops down about the top curved portion of the drain-tile.

The guide bar 351 is made adjustable so that it can be positioned close to the top of different diameter drain-tiles. To this end, the top center of the guide bar 351 is connected to an actuator rod 357. The rod 357 extends up through a hole in top wall 319 to a position adjacent the top rear end of guide shell 315 where it is pivotally connected by a pin 359 to an adjustment wheel 361 adjacent its periphery. The wheel 361 is rotatably mounted on an axle 363 mounted on a sidewall 317. Rotation of the wheel 361 by a handle 365 in either direction moves the rod 357 up or down thus raising or lowering the guide bar 351. Position indicators can be provided on the sidewall 317 adjacent wheel 361 showing the different size drain-tiles to be accommodated. Suitable locking means would lock the wheel, and thus bar 351 in place when moved to accommodate a particular drain-tile size. While one type of bar adjustment has been shown, other types could be used as well. The rod 357 is protected by a cover 371 mounted on shell 315 with suitable braces 373.

In operation, when the plow is being used to dig a trench, lay the drain-tile in the trench, and cover the trench, the tile is being pulled down through the channel 19 in the plow body or through the channel 335 in the guide shell, depending on the size of the drain-tile. The tile exists through outlets 27 and 349 or through outlet 349 only. At the same time, a cover strip 303 is being laid down on top of the tile by guide bar 351, before the tile leaves the guide shell.

The plow can be equipped with a level or grade indicator of a known type which may be associated with the above-mentioned electronical sighting system so that the tile is laid at a proper slope to ensure drainage.

I claim:

1. A plow for use in laying a draintile, comprising:
  a narrow plow body including an upright elongated portion having a leading edge, and a triangular portion at the bottom, front end of said upright portion, said triangular portion being fixed relative to and projecting forwardly from said upright portion, and having an angled leading edge thereon that extends forwardly and downwardly from said leading edge of said upright portion, the bases of said upright and triangular portions forming the base edge of the plow;
  means within the plow for guiding the drain-tile from an inlet high in the upright portion to an outlet at the bottom, rear of the upright portion;
  an elongated plow blade having a generally flat upper surface and having a tip on its front, lower end;
  securing means for detachably fixing said plow blade to the angled leading edge of said triangular portion of the plow body, said securing means being constructed and arranged to allow incremental adjustment in the position of the plow blade relative to said leading edge of said triangular portion, to compensate for wear of the tip of said plow blade; and
  a linkage for connecting the plow body at two spaced-apart points on its upper portion to a tractor.

2. A plow as claimed in claim 1, wherein said securing means includes means for longitudinally guiding the plow blade linearly along the leading edge of said triangular portion of said plow body.

3. A plow as claimed in claim 1, further comprising a wear shoe, and means for detachably fixing the wear shoe to the base edge of the plow to extend forwardly from the rear of said base edge over a major portion of the length of said base edge.

4. A plow as claimed in claim 3, wherein the drain-tile outlet is in the rear of the wear shoe.

5. A plow as claimed in claim 1, further including:
  a plow knife detachably fixed to said leading edge of said upper portion of said plow body on top of the plow blade, said plow knife including a support bar, and a knife blade mounted on said support bar and projecting forwardly from said leading edge and said support bar.

6. A plow as claimed in Claim 7, including additionally:
  spaced-apart sets of brace plates on both sides of said knife blade and extending forwardly from said support bar, said brace plates extending upwardly from their leading ends to guide earth therealong.

7. A plow as claimed in claim 7, further including:
  lugs on said leading edge of the upright portion of the plow body, said support bar having slots therethrough for receiving said lugs; and
  wedge connectors insertable into said lugs, after they are passed through the slots, to wedge said support bar of the knife tightly against the plow body.

8. A plow as claimed in claim 1, wherein the linkage comprises:
  a first set of links forming a first parallelogram linkage, the forward ends of said links of said first set being connectable to two vertically spaced points on a tractor;
  a second set of links forming a second parallelogram linkage, the forward ends of said links of said second set being connected with the rear ends of the links of said first set, and the rear ends of the links of said second set being connected to said plow body and connecting the plow body to the first set of links;

means connected with said first set of links for operating said first parallellogram linkage to position the plow; and means connected with said second set of links for operating said second parallelogram linkage to further position the plow.

9. A plow as claimed in claim 8, wherein the second parallelogram linkage has upper and lower support links, each pivotably connected at one end to the plow body; and means for adjusting the length of the upper support link.

10. A plow as claimed in claim 9, wherein the upper support link has a first link section with a connecting plate, a second link section with a pair of spaced-apart connecting plates, and means for connecting the plates together, when interleaved, at selected interleaved positions.

11. A plow as claimed in claim 10, wherein the one plate has two or more rows of spaced-apart holes along its length, and the other two plates have two or more rows of spaced-apart holes along their length, the rows being aligned when the plates are interleaved, and bolts passing through selected aligned holes to connect the plates together.

12. A plow as claimed in claim 11, wherein the one plate has two or more spaced-apart slots along its length, the other plates having two or more rows of holes aligned with the slots, and bolts passing through the holes and slots bolt the plates together.

13. A plow as claimed in claim 1, further comprising means on the plow body for directing a cover strip onto the tile as it is being laid.

14. A plow as claimed in claim 13, including means for mounting a reel of cover strip on the plow body.

15. A plow as claimed in claim 13, including means for detachably connecting the cover strip directing means to the plow body.

16. A plow as claimed in claim 14, including a channel for guiding the cover strip from the reel to adjacent the drain-tile outlet in the plow body, and guide means adjacent the drain-tile outlet for laying the cover strip onto the drain-tile.

17. A plow as claimed in claim 16, including means for adjusting the position of the guide means to accomodate drain-tiles of different size.

18. A plow as claimed in claim 17, wherein the operating means for the adjusting means are located on the top end of the plow body.

19. A plow for use in laying a drain-tile, comprising:
a narrow plow body having an upright elongated portion and a triangular portion at the bottom, front end of the upright portion, said triangular portion having an angled leading edge, the bases of said upright and triangular portions forming the base of the plow;

means within the plow for guiding the drain-tile from an inlet high in the upright portion to an outlet at the bottom, rear of the upright portion;

a plow blade detachably fixed to the angled leading edge of the triangular portion of the plow body;

means on the plow body for directing a cover strip onto the tile as it is being laid, said means including:

means for mounting a reel of cover strip on the plow body;

channel means for guiding the cover strip from the reel to adjacent the drain-tile outlet in the plow body;

guide means adjacent the drain-tile outlet for laying the cover strip onto the drain-tile; and means for adjusting the position of the guide means to accommodate drain-tiles of different size; and a linkage for connecting the plow body at two spaced-apart points on its upper portion to a tractor.

20. A plow as claimed in claim 19, wherein the operating means for the adjusting means are located on the top end of the plow body.

21. A plow for use in laying a drain-tile, comprising:
a narrow plow body having an upright elongated portion and a triangular portion at the bottom, front end of the upright portion, said triangular portion having an angled leading edge, the bases of said upright and triangular portions forming the base of the plow;

means within the plow for guiding the drain-tile from an inlet high in the upright portion to an outlet at the bottom, rear of the upright portion;

a plow blade detachably fixed to the angled leading edge of the triangular portion of the plow body; and a linkage for connecting the plow body at two spaced-apart points on its upper portion to a tractor, said linkage comprising:

a first set of links forming a first parallelogram linkage; and a second set of links forming a second parallelogram linkage, and connecting the plow body to said first set of links;

said second parallelogram linkage having upper and lower support links, each pivotally connected at one end to the plow body, said upper support link having a first link section with a first connecting plate, a second link section with a pair of spaced-apart, second connecting plates, and means for connecting said first and said second connecting plates together, when interleaved, at selected interleaved positions, whereby the length of said upper support link can be adjusted.

22. A plow as claimed in claim 21, wherein said first connecting plate has two or more rows of spaced-apart holes along its length, and said second connecting plates have two or more rows of spaced-apart holes along their length, the rows being aligned when the plates are interleaved, and further including bolts passable through selected aligned holes in said rows to connect the plates together.

23. A plow as claimed in claim 22, wherein said first connecting plate has two or more spaced-apart slots along its length, said second plates having two or more rows of holes aligned with said slots, and further including additional bolts passable through said slots and the holes aligned therewith for securing the connecting plates together.

* * * * *